(12) United States Patent
Heemann et al.

(10) Patent No.: US 8,076,422 B2
(45) Date of Patent: Dec. 13, 2011

(54) COEXTRUDABLE HOT-MELT ADHESIVE

(75) Inventors: Marcus Heemann, Neuss (DE);
 Eckhard Pürkner, Düsseldorf (DE);
 Volker Erb, Düsseldorf (DE); Maja Schroeder, Ratingen (DE); Dirk Vianden, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/813,694

(22) Filed: Jun. 11, 2010

(65) Prior Publication Data

US 2010/0256274 A1 Oct. 7, 2010

Related U.S. Application Data

(63) Continuation of application No. PCT/EP2008/066122, filed on Nov. 25, 2008.

(30) Foreign Application Priority Data

Dec. 13, 2007 (DE) .......................... 10 2007 060 533

(51) Int. Cl.
 *C08L 23/16* (2006.01)
 *C08K 5/01* (2006.01)

(52) U.S. Cl. ........ 525/240; 524/477; 524/474; 524/476; 524/487; 524/570

(58) Field of Classification Search .................. 525/240; 524/477, 474, 476, 487, 570
See application file for complete search history.

(56) References Cited

U.S. PATENT DOCUMENTS

| 5,530,054 | A | 6/1996 | Tse et al. |
| 5,548,014 | A * | 8/1996 | Tse et al. .................. 524/477 |
| 6,015,524 | A | 1/2000 | Kuder et al. |
| 6,107,430 | A | 8/2000 | Dubois et al. |
| 6,872,279 | B1 | 3/2005 | Kolowrot et al. |
| 2004/0077759 | A1 | 4/2004 | Bardiot et al. |
| 2008/0190541 | A1* | 8/2008 | Terfloth et al. .................. 156/60 |

FOREIGN PATENT DOCUMENTS

| DE | 102005007770 A1 | 8/2006 |
| GB | 1239999 A | 7/1971 |
| WO | 9733921 A1 | 9/1997 |
| WO | 0110967 A1 | 2/2001 |
| WO | 2005028584 A1 | 3/2005 |

* cited by examiner

*Primary Examiner* — Ling-Siu Choi
(74) *Attorney, Agent, or Firm* — David P. LeCroy

(57) ABSTRACT

A hot-melt adhesive for resealable packaging, containing 30 to 90 wt. % of at least one copolymer based on ethylene and/or propylene together with $C_4$ to $C_{12}$-α-olefins, which is obtainable by metallocene-catalyzed polymerization, with a melt index of 5 to 100 g/10 min (DIN ISO 1133), 5 to 50 wt. % of tackifier resins with a softening point of 80 to 140° C., 0 to 15 wt. % of waxes with a melting point of 120 to 170° C., 0.1 to 20 wt. % of additives and auxiliaries, the adhesive having a viscosity of 25,000 mPa·s to 250,000 mPa·s, measured at a temperature of 170 to 190° C.

19 Claims, No Drawings

COEXTRUDABLE HOT-MELT ADHESIVE

This application is a continuation of International Application No. PCT/EP2008/066122 filed Nov. 25, 2008, which claims the benefit of German Patent Application No. 10 2007 060 533.3 filed Dec. 13, 2007.

The invention relates to a pressure-sensitive adhesive for resealable packaging, which may be coextruded as a hot-melt adhesive. The invention also relates to the use of this hot-melt adhesive for adhesively bonding two films, this multilayer film being capable of use in resealable packaging.

Pressure-sensitive adhesives (PSA) are generally known. These are solid adhesives, which after application produce a tacky layer on the surface. Such adhesives are known for use with film packaging, in which containers are coated at the edges with such adhesives, which allow resealing of the film lid after opening.

U.S. Pat. No. 6,107,430 describes a hot-melt adhesive which comprises at least one linear homogeneous ethylene/$C_3$-$C_{20}$-α-olefin copolymer, which has a density of from 0.850 g/cm$^3$ to 0.895 g/cm$^3$. The copolymer should here have a melt flow index of 200 to 2000 g/10 min. Those with melting points of below 126° C. are described as waxes.

U.S. Pat. No. 5,530,054 is additionally known, in which a hot-melt adhesive is described which consists substantially of a copolymer based on ethylene and $C_4$ to $C_{20}$-α-olefins and contains a hydrocarbon tackifier resin. The ethylene/α-olefin copolymers are produced by way of metallocene catalysis. The quantity of these resins is above 45%. A selection of waxes is not described.

DE 199 44 225 describes sprayable hot-melt adhesives, which contain 30 to 70 wt. % of a substantially amorphous poly-α-olefin copolymer, said adhesives being intended to have a density of <0.90 g/cm$^3$ and a low melt viscosity of between 1000 and 20,000 mPa·s. In particular, polyolefins are described, which may be provided by free-radical degradation of poly-α-olefins.

EP 0886 656 describes hot-melt adhesives which contain as necessary constituents ethylene/α-olefin copolymers and tackifier resins. A plurality of optional constituents are described, but the viscosities of the adhesives are low, being generally below 10,000 mPa·s in the examples. Specific adhesives with a high melt viscosity are not described.

WO 2005/028584 describes hot-melt adhesives containing polyolefin polymers produced by metallocene catalysis. These polymers are intended to have a viscosity of up to 9000 mPa·s at a temperature of 149° C., while the hot-melt adhesive itself has a viscosity of below 2000 mPa·s.

US 2004/077759 describes hot-melt pressure-sensitive adhesives which contain styrene block copolymers of the ABA and AB structures and contain a tackifier resin. In this case, the adhesives are intended to exceed a specified viscosity limit at 130° C., and to exhibit a tear strength as a function of elongation at break which lies under a stated measurement curve.

Such hot-melt pressure-sensitive adhesives are applied in general at temperatures of up to 160° C. Thereafter, the relevant substrates are adhesively bonded together under pressure, for example with rolling. However, these utilization methods have a plurality of steps and require complex machinery. Other methods work with adhesives which may be directly coextruded at elevated temperature during production of the films. Such adhesives have to exhibit high thermal stability and suitable viscosity, so that they can form a uniform layer in the context of film extrusion.

Alternative production methods are for example blown film methods. In these, the two films are produced in parallel as a tube, an adhesive film being extruded between the films for adhesive bonding purposes. In this case, the viscosity at the extrusion temperature has to allow a uniform liquid adhesive film. Since extrusion of the film polymers generally takes place above 180° C., a continuous, stable adhesive film must also be producible at these temperatures. Adhesion to the substrate films must be such that a satisfactory adhesive bond is made possible when producing a multilayer film. On the other hand, in the case of use as a packaging film, the top layer needs to be separable, a tacky layer being exposed on the top layer.

The object of the present invention is therefore to provide a hot-melt adhesive based on polyethylene or polypropylene copolymers with high thermal stability and good processing behavior, which adhesively bonds films, in particular also polyolefin films, and may be used in the coextrusion method as a laminating adhesive when producing films. No low molecular weight substances capable of migration should here be present in the adhesive.

The object is achieved in that a hot-melt adhesive is provided, containing 30 to 90 wt. % of at least one copolymer based on ethylene and/or propylene and $C_4$ to $C_{20}$-α-olefins, which is obtainable by metallocene-catalyzed polymerization, with a melt index of 5 to 100 g/10 min (measured to DIN ISO 1133 at 190° C., 2.16 kg, 10 min), 5 to 50 wt. % of at least one tackifying resin, 0 to 15 wt. % of at least one wax with a melting point of 120 to 170° C., and 0.1 to 25 wt. % of additives, the adhesive having a viscosity of 25,000 to 250,000 mPa·s, measured at a temperature of 170 to 190° C. The total of the constituents is intended to amount to 100%.

The present invention also provides the use of such hot-melt adhesives for laminating films, in particular by coextrusion using the blown film method. The present invention also provides the use of such adhesives to produce multilayer films for packaging, one packaging side taking the form of a tear-open multilayer film which exposes a tacky surface at the opened location after tearing open.

The hot-melt adhesive according to the invention contains at least one homo- or copolymer based on ethylene and/or propylene and optionally further copolymerizable monomers. The monomers which may be used in addition to ethylene and/or propylene are known olefinically unsaturated monomers copolymerizable with ethylene or propylene. In particular, they are linear or branched $C_4$ to $C_{20}$-α-olefins, such as butene, hexene, methylpentene, octene; cyclically unsaturated compounds such as norbornene or norbornadiene; symmetrically or asymmetrically substituted ethylene derivatives, with $C_2$ to $C_{12}$ alkyl residues being suitable as substituents. Copolymers modified with aromatic unsaturated compounds are also suitable, but preferably no aromatic monomers are present. The homopolymers or copolymers may also be those which may also contain more than two different monomers. In this case, the quantity of comonomers should preferably amount to below 30 wt. %. Amorphous atactic polyolefins are frequently used. One embodiment of the invention uses copolymers based on ethylene with $C_4$ to $C_{20}$-α-olefins. Another embodiment uses polymers of propylene with $C_4$ to $C_{20}$-α-olefins. Copolymers based on ethylene and propylene are likewise suitable.

The resultant (co)polymers have a molecular weight of from 1000 up to 250,000 g/mol, in particular of from 3000 up to 100,000 g/mol, particularly preferably of above 5000 g/mol (number average molecular weight, $M_N$, determined by GPC).

In particular, suitable copolymers are those which are produced by catalysis with metallocene compounds. The melt flow index of these polymers should amount to from 5 g/10 min up to 100 g/10 min, preferably up to 40 g/10 min, in particular below 30 g/min (measured at 190° C., 2.16 kg, DIN ISO 1133). The viscosity of such polymers is high at the service temperatures conventional for hot-melt adhesive. The softening point of the polymers should lie above 130° C., in particular above 160° C. The quantity of these copolymers should amount to 30-90 wt. % relative to the hot-melt adhesive, in particular to between 40 to 80 wt. %.

These polymers are known in the literature and may be obtained commercially from various manufacturers. The (co) polymer may be a polymer, but it is also possible to use a mixture. In this case, according to a preferred embodiment, the mixture should also comply with the limits in relation to melt flow index and softening point.

The hot-melt adhesive according to the invention contains at least one tackifying resin as a further constituent. The resin brings about additional tackiness. It is used in an amount of 5 to 50 wt. %, preferably 10 to 40 wt. %. The resins are in particular resins which have a softening point of between 80 and 140° C. (measured to ASTM E28). These are for example aromatic, aliphatic or cycloaliphatic hydrocarbon resins, together with modified or hydrogenated derivatives. Further resins usable for the purposes of the invention are polyterpene resins, phenolically or aromatically modified polyterpene resins, modified natural resins such as resin acids from gum resin, tall oil resin or wood resin, optionally also hydroabietyl alcohol and the esters thereof, acrylic acid copolymers, such as styrene/acrylic acid copolymers and resins based on functional hydrocarbon resins. It is preferable to use partly or fully hydrogenated hydrocarbon resins and rosin resins.

In one particular embodiment, 0 to 15 wt. %, in particular up to 10 wt. % of resins may additionally be used which have a softening point of 0 to 50° C., in particular up to 20° C. The resins are preferably hydrogenated hydrocarbon resins.

The hot-melt pressure-sensitive adhesive may contain waxes in quantities of 0 to 15 wt. %, preferably of 0.5 to 10 wt. %, in particular of up to 5 wt. %. The quantity is such that, on the one hand, viscosity is adjusted to the desired range, while, on the other hand, adhesion is not negatively affected. The wax may be of natural origin, optionally also in chemically modified form, or of synthetic origin. Natural waxes which may be used are vegetable waxes, animal waxes, or indeed mineral waxes or petrochemical waxes. Chemically modified waxes may take the form of hard waxes, such as montan ester waxes, Sasol waxes etc. Polyalkylene waxes and polyethylene glycol waxes are used as synthetic waxes. The wax should have a melting point of 120 to 170° C. (ASTM D 87). If the melting point is too low, the adhesive according to the invention is of too low a viscosity. Preferably, petrochemical waxes, such as petroleum jelly, paraffin waxes, microcrystalline waxes, hydrogenated or synthetic waxes are used.

In addition to the above-mentioned constituents, the hot-melt pressure-sensitive adhesive may also contain 0.1 to 20 wt. % of additives conventionally used in hot-melt adhesives. Examples of these are stabilizers, other polymers, adhesion promoters and/or antioxidants. In this way, it is possible to influence specific application-related characteristics, such as for example cohesive strength, viscosity, softening point, flow behavior, adhesion. Fillers may furthermore optionally be added to increase strength.

The other polymers may for example be elastic thermoplastic polymers. Such elastic polymers are understood in particular to be styrene block copolymers, which may have elastic or rubber-elastic characteristics. These may be diblock or triblock copolymers, which may comprise at least one styrene block. Examples thereof are SBR, SAN, styrene/isoprene copolymers (SIS), styrene/ethylene/butylene copolymers (SEBS), styrene/ethylene/propylene copolymers (SEPS), styrene/isoprene/butylene copolymers (SIBS), styrene/butadiene copolymers (SBS), hydrogenated styrene/butylene/butadiene copolymers (SBBS). Such block copolymers are known to a person skilled in the art and are commercially obtainable. The characteristics of the block copolymer may be influenced by means of styrene block length.

The polymers should be selected by a person skilled in the art so as to achieve good compatibility with the other constituents of the hot-melt adhesive. The quantity of copolymers may amount to 10 wt. %, and in particular 0.1 to 5 wt. % of at least one thermoplastic elastomer may be present.

In another embodiment, the hot-melt adhesive may additionally contain at least one polymer based on olefins and (meth)acrylic acid esters, which comprises carboxyl groups and/or anhydride groups. The olefin monomers may be selected from known $C_2$ to $C_5$ olefins, in particular ethylene or propylene. The (meth)acrylic acid esters are selected from (meth)acrylic esters with low molecular $C_1$ to $C_8$ alkanols, with methyl (meth)acrylate, ethyl (meth)acrylate, propyl (meth)acrylate, butyl (meth)acrylate or 2-ethylhexyl (meth) acrylate, individually or in combination, being particularly suitable. The copolymer has also to comprise carboxyl groups and/or anhydride groups. This may be achieved by polymerization with appropriate functional monomers or by subsequent modification of the polyolefin copolymers. It is possible, for example, to introduce COOH groups by oxidation. It is furthermore possible to introduce COOH or anhydride groups into the polymer by free-radical grafting reactions, for example with maleic anhydride.

In a preferred embodiment of the polymer, however, said polymer is a terpolymer based on olefins and (meth)acrylic acid esters together with unsaturated monomers containing acid groups or anhydride groups. For example, these monomers may be selected from copolymerizable unsaturated monocarboxylic acids, such as (meth)acrylic acid, crotonic acid, itaconic acid, citraconic acid; unsaturated dicarboxylic acids, such as maleic or fumaric acid, semi-esters of maleic/fumaric acid with $C_1$ to $C_8$ alkanols; anhydrides of such acids. Derivatives of maleic acid are particularly suitable.

Polymers comprising suitable carboxyl groups are commercially obtainable and known to a person skilled in the art.

The polymer should have a molecular weight (Mn) of between 3000 and 50,000 g/mol, in particular 8000 to 25,000 g/mol. The quantity of COOH/anhydride groups should be between 1 and 100 mg of KOH/g, in particular between 5 and 50 mg of KOH/g. If the number of carboxyl groups is high, problems arise with compatibility of the constituents of the hot-melt adhesive; if the number of carboxyl groups is low, adhesion is impaired. Irrespective of molecular weight, it is convenient for the melt flow index of the polymer to be low. The melt flow index of the polymer should be from 1 to 400 g/10 min, in particular from 50 to 300 g/10 min (DIN ISO 1133). In this case, the softening point should be from 50° C. to 150° C., in particular from 90 to 110° C. The quantity of polymer bearing COOH groups should be between 0 and 15 wt. % and in particular between 0.5 and 10 wt. %.

Plasticizers are conventionally used to adjust viscosity or flexibility and are contained in the hot-melt adhesive according to the invention in general in a concentration of from 0 to 15 wt. %, preferably in a concentration of below 10 wt. %. Suitable plasticizers are medical white oils, naphthenic mineral oils, polypropylene, polybutene, polyisobutylene or polyisoprene oligomers, hydrogenated polyisoprene and/or polybutadiene oligomers, benzoate esters, phthalates, adipates, vegetable or animal oils and the derivatives thereof.

Hydrogenated plasticizers are selected for example from the group of paraffinic hydrocarbon oils. Polypropylene glycol and polybutylene glycol are suitable, as is polymethylene glycol. Esters may optionally also be used as plasticizers, for example liquid polyesters and glycerol esters or plasticizers based on aromatic dicarboxylic acid esters. The plasticizers should also be stable in the hot-melt adhesive after application and not migrate. For this reason, polypropylene, polybutene, polyisobutylene and polyisoprene oligomers are suitable, also in hydrogenated form. Another embodiment does not use any plasticizers.

The stabilizers have the task of protecting the adhesive composition from decomposition during application. Examples which may in particular be mentioned are antioxidants or light stabilizers. They are conventionally added to the hot-melt adhesive in quantities of up to 3 wt. %, preferably in quantities of for instance 0.1 to 1.0 wt. %.

Dyes or fillers, such as titanium dioxide, talcum, clay and the like may for example also be present.

Furthermore, the hot-melt adhesive according to the invention may contain adhesion promoters. Adhesion promoters are substances which improve adhesion of the hot-melt adhesive to the substrate to be adhesively bonded. In particular, adhesion promoters may improve the ageing behavior of adhesive bonds exposed to a moist atmosphere. Typical adhesion promoters are for example ethylene/acrylamide comonomers, reactive organosilicon compounds or phosphorus derivatives.

The additives, such as softeners, stabilizers or adhesion promoters, are known to a person skilled in the art. They are commercial products and a person skilled in the art may select them in accordance with the desired characteristics. Care should in this case be taken to ensure compatibility with the polymer blend.

One particular embodiment of the invention consists of 40 to 80 wt. % of copolymers of $C_2$ or $C_3$ with $C_4$ to $C_{12}$-α-olefins, 10 to 40 wt. % of tackifying resins and optionally hydrocarbon resins, 0.5 to 10 wt. % of waxes, in particular petrochemical or hydrogenated waxes, and 0.1 to 20 wt. % of additives, the additives being selected from thermoplastic polymers, polymers with carboxyl or anhydride groups, pigments, plasticizers, and/or stabilizers, the necessary elevated viscosities being obtained.

The hot-melt adhesive according to the invention is produced by blending. In this case, all the components are introduced simultaneously, heated and then homogenized, or first of all the more readily melting components are introduced and blended, and thereafter the further adhesive constituents are added and finally further additives which are temperature-sensitive. It is also possible to produce the hot-melt adhesive continuously in an extruder. After transferring or portioning of the completely homogenized mixture, it is left to cool, setting as it does so. The hot-melt adhesive according to the invention is of firm consistency and free of solvents. Methods of producing, transferring and packaging hot-melt adhesives according to the invention are known to a person skilled in the art. It is homogeneous in the solid and liquid phases, i.e. a melt is clear and not opaque or cloudy.

The hot-melt adhesives according to the invention exhibit high viscosity, which is matched to the utilization method. In this case, the hot-melt adhesives have a viscosity of 25,000 to 250,000 mPa·s, preferably of 30,000 to 150,000 mPa·s, in particular of more than 50,000 mPa·s at a temperature in the range from 170° C. to 190° C. (measured using a Brookfield Thermosel, spindle 27, at the indicated temperature, EN ISO 2555).

The hot-melt adhesive according to the invention is tacky. If it is applied in a thin layer between two film substrates, it bonds them. However, on exposure to a mechanical load, these layers may be cohesively separated again. The exposed adhesive layer then remains tacky.

The application method depends on the type of substrate to be bonded and the suitable machinery therefor. Application to films may take place over extensive areas or in strips. Application may proceed for example by roller application systems. In particular, however, an adhesive according to the invention is suitable for coextrusion with films to be laminated. In this respect, the hot-melt adhesive is coextruded with the film during film production. A second film is then applied and adhesively bonded to the adhesive layer. Another preferred production method is blown film extrusion. In this method, a continuous film of the adhesive according to the invention is extruded in tube form in a multiple annular die between two films to be laminated. This may be performed for example at temperatures of 170 to 230° C., in particular of around 200° C. The two outer films are brought together and adhesively bonded with the adhesive according to the invention during cooling. The viscosity is matched to the extrusion temperature. If the viscosity of the adhesive is too low, no continuous liquid adhesive film is obtained and the extensive adhesive bond is defective.

The time which elapses until the substrates are adhesively bonded depends on the temperature and crystallization behavior of the hot-melt adhesive. Good application characteristics are achieved by the hot-melt adhesive according to the invention. Even in the case of an extended holding period in the molten phase, no separation of individual constituents or phase separation is to be observed. Adhesion to the substrate films is good. In particular, adhesion to multilayer films with a polyolefin film, in particular a polyethylene film, as a layer is good. The flexible bond between substrate and adhesive also pertains during storage at low temperatures.

The multilayer films producible according to the invention may consist of various film layers, which are joined together with the hot-melt adhesive. A film should preferably be a polyolefin film, in particular a polyethylene film. This should be suitable as a heat-sealing layer. The second film layer is conventionally arranged as an outer layer. This layer should be tear-resistant, but other flexible plastics films may be used, for example those consisting of polyolefins, polyamides, polyesters or PVC. It is convenient for the films to be coextruded. However, it is also possible to adhesively bond separately produced films with the hot-melt adhesive according to the invention and a polyolefin film. In this case, printed or metallized films may also be adhesively bonded. The multilayer films according to the invention may then be further processed in a known manner. For example, they may be coated, printed and assembled. They are then suitable for further processing as a packaging constituent. The films laminated with an adhesive according to the invention display good constituent compatibility and stability. After adhesive bonding and on contact with foodstuffs, any substances which may be capable of migration remain bound in the adhesive. Low molecular weight constituents, which exhibit elevated migration and extractability, are avoided according to the invention. For this reason, no corresponding substances are able to migrate out of the film surface. On contact with foodstuffs, the latter are not affected by ingredients of the multilayer film. According to the invention, the adhesives and the adhesively bonded substrates do not contain any constituents capable of migration (measurable to EU Directive 82/711/EEC).

The hot-melt adhesives according to the invention are used to laminate multilayer films. They are suitable in particular for adhesively bonding flexible films of polyethylene or polypropylene. The multilayer films adhesively bonded with a hot-melt adhesive according to the invention are suitable for producing packaging, in particular resealable packaging, in the food processing industry. In this case, containers are molded from plastics, which are sealed with a multilayer film according to the invention as lid once they have been filled with the product to be packaged. This is conventionally performed by hot or cold sealing. On opening of the packaging, the multilayer film is destroyed at the seal point between the film layers, a free layer of the permanently tacky pressure-sensitive adhesive according to the invention arising at the container edge. This may be reversibly resealed with the lidding film.

Good processability, in particular by blown film coextrusion, is ensured by the adhesive according to the invention having a long open time and high melt viscosity. Continuous liquid adhesive films may be produced, which may be brought together immediately thereafter under heat with the two coextruded films. After cooling, adhesively bonded multilayer films are obtained. The hot-melt adhesives according to the invention are distinguished in particular by very good adhesion to the above-stated substrate films. The composite films produced in this way remain flexible even at low temperature, but exhibit good stability even under heat.

The present invention is explained in greater detail below by Examples.

EXAMPLES

Example 1

Comparison

| 35 parts of | ethylene/1-octene copolymer | (Affinity GA 1950) |
| 45 parts of | tackifier resin, hydrocarbon resin | (I-Marv P-125) |
| 20 parts of | paraffin wax | (Sasol wax H 1) |

Example 2

| 50 parts of | ethylene/1-octene copolymer | (Exact 8230) |
| 30 parts of | tackifier resin, hydrocarbon resin | (Regalite S 1100) |
| 3 parts of | ethylene/ethyl acrylate/MSA terpolymer | (Lotader 8200) |
| 2 parts of | paraffin wax | (Sasol wax R 2531) |
| 15 parts of | plasticizer | (Vistanex PAR 1300) |

Example 3

| 55 parts of | ethylene/1-octene copolymer | (Exact 8230) |
| 35 parts of | tackifier resin | (Regalite S 1100) |
| 10 parts of | paraffin wax | (Vistanex PAR 1300) |

| Exact 8230 | MFI 30 g/10 min |
| Regalite S 1100 | softening point 100° C. |
| Vistanex PAR 1300 | melting point 10° C. |
| Affinity GA 1950 | MFI 500 g/10 min |
| Sasol wax H1 | melting point 55° C. (ASTM D 87) |
| Sasol wax R 2531 | melting point 130° C. |

Method:

The constituents are melted and stirred in a conventional commercial laboratory stirrer at 180° C. until they are homogeneous. Then they are transferred into suitable vessels for cooling.

Results:

| Example | 1 | 2 | 3 |
|---|---|---|---|
| Melt stability | yes | yes | yes |
| Viscosity (mPa · s) | 1600 (160° C.) | 68,000 (190° C.) | 75,000 (190° C.) |

Adhesive bonding to approx. 50 μm films,
Application with coating knife at 180° C.,
Layer thickness approx. 20 μm Adhesion was determined at 25° C. and at −10° C. by tensile testing on two adhesively bonded films. Adhesion was good in all cases.

PE film with OPP film, PE film with PP film, PE film with PET film.

Test Method:

Viscosity: indicated temperature; Brookfield Thermosel, spindle 27

Melt stability: no phase separation at 170° C. after 72 hours, slight change in viscosity When applying Examples 1 to 3 from a slit die (180° C.), a stable, free-falling film cannot be obtained with the material of the comparison test, the material instead splitting up.

The invention claimed is:

1. A hot-melt adhesive for resealable packaging comprising:
   a) 30 to 90 wt. % of a metallocene-catalyzed copolymer, wherein the copolymer consists of an ethylene and/or propylene with $C_4$ to $C_{20}$-α-olefins, and the copolymer has a melt index of 5 to 100 g/10 min at 190° C.;
   b) 5 to 50 wt. % of a tackifying resin, which has a softening point of 80 to 140° C.;
   c) 0.5 to 15 wt. % of a wax, which has a melting point of 120 to 170° C.; and
   d) 0.1 to 20 wt. % of an additive and/or auxiliary; and
   wherein the adhesive is a pressure sensitive adhesive and has a viscosity of 25,000 to 250,000 mPa·s at 170 to 190° C.

2. The hot-melt adhesive of claim 1, further comprising 0.5 to 10 wt. % of a hydrogenated hydrocarbon resin with a softening point of 0 to 50° C.

3. The hot-melt adhesive of claim 1, comprising up to 5 wt. % of the additive, wherein the additive is selected from the group consisting of a UV stabilizer, pigment, adhesion promoter and mixtures thereof.

4. The hot-melt adhesive of claim 1, further comprising 0.5 to 15 wt. % of polyisobutylene.

5. The hot-melt adhesive of claim 1, wherein the adhesive is essentially free of a plasticizer.

6. The hot-melt adhesive of claim 1, further comprising 0.5 to 10 wt. % of a polymer based on olefin and (meth)acrylic acid ester.

7. The hot-melt adhesive of claim 6, wherein the polymer comprises anhydride or carboxyl groups.

8. The hot-melt adhesive of claim 1, wherein the adhesive further comprises a rosin resin, a tall oil resin or a fully or partly hydrogenated hydrocarbon resin.

9. The hot-melt adhesive of claim 1 comprising:
 a) 40 to 80 wt. % of the metallocene-catalyzed copolymer, wherein the copolymer consists of an ethylene and/or propylene with $C_4$ to $C_{12}$-α-olefins, and the copolymer which has a melt index of 5 to 40 g/10 min at 190° C.;
 b) 10 to 40 wt. % of the tackifying resin;
 c) 0.5 to 10 wt. % of the wax; and
 d) 0.1 to 20 wt. % of the additive and/or auxiliary.

10. The hot-melt adhesive of claim 9, wherein the adhesive has a viscosity of from 30,000 to 150,000 mPa·s at 170 to 190° C.

11. The hot-melt adhesive of claim 1, wherein the adhesive passes an EU Directive 82/711/EEC requirements.

12. An article comprising the adhesive of claim 1.

13. The article of claim 12 which is a multilayer film.

14. The article of claim 13 which is a foodstuffs packaging.

15. The article of claim 12 comprising a polyolefin film.

16. The article of claim 12 which is a resealable packaging.

17. The article of claim 15 comprising a polyethylene film.

18. A method of making the article of claim 12 comprising blown film coextrusion.

19. The method of claim 18 wherein the coextrusion occurs at a temperature greater than 170° C.

* * * * *